United States Patent
Broomer et al.

(10) Patent No.: US 8,296,945 B2
(45) Date of Patent: Oct. 30, 2012

(54) METHOD FOR REPAIRING A TURBINE NOZZLE SEGMENT

(75) Inventors: Mark Broomer, Boston, MA (US); Victor Hugo Silva Correia, Milton Mills, NH (US)

(73) Assignee: General Electric Company, Schenectady, NY (US)

( * ) Notice: Subject to any disclaimer, the term of this patent is extended or adjusted under 35 U.S.C. 154(b) by 1309 days.

(21) Appl. No.: 11/967,178

(22) Filed: Dec. 29, 2007

(65) Prior Publication Data
US 2009/0165301 A1    Jul. 2, 2009

(51) Int. Cl.
*B23P 6/00* (2006.01)

(52) U.S. Cl. ............ 29/889.1; 29/889.22; 29/402.08; 415/115

(58) Field of Classification Search .......... 29/889.1, 29/889.22, 402.04, 402.05, 402.06, 402.08, 29/402.09, 402.11, 402.18; 415/115
See application file for complete search history.

(56) References Cited

U.S. PATENT DOCUMENTS

| | | | |
|---|---|---|---|
| 4,353,679 A | 10/1982 | Hauser | |
| 5,197,852 A | 3/1993 | Walker et al. | |
| 5,224,822 A | 7/1993 | Lenahan et al. | |
| 5,392,513 A * | 2/1995 | Mazzola et al. | 29/889.1 |
| 2002/0159880 A1 | 10/2002 | Morris et al. | |
| 2003/0037436 A1* | 2/2003 | Ducotey et al. | 29/889.1 |
| 2003/0106215 A1* | 6/2003 | Heyward et al. | 29/889.1 |
| 2004/0096322 A1* | 5/2004 | Caddell et al. | 415/210.1 |
| 2005/0235492 A1* | 10/2005 | Arness et al. | 29/889.1 |
| 2006/0127212 A1* | 6/2006 | Durocher et al. | 415/116 |
| 2006/0257244 A1* | 11/2006 | Steplewski et al. | 415/115 |
| 2007/0172351 A1* | 7/2007 | Arness et al. | 415/208.1 |
| 2009/0169360 A1 | 7/2009 | Broomer et al. | |

* cited by examiner

*Primary Examiner* — David Bryant
*Assistant Examiner* — Ryan J Walters
(74) *Attorney, Agent, or Firm* — General Electric Company; Matthew P. Hayden; David J. Clement (57) ABSTRACT

A method for repairing a turbine nozzle segment includes providing a turbine nozzle segment having an enclosure with an integral discourager, removing the enclosure and/or the discourager from the turbine nozzle segment and attaching a new enclosure ad/or discourager to the turbine nozzle segment.

14 Claims, 8 Drawing Sheets

METHOD FOR REPAIRING A TURBINE NOZZLE SEGMENT

BACKGROUND OF THE INVENTION

The exemplary embodiments relate generally to gas turbine engine components and more particularly to turbine nozzle segments having improved cooling.

Gas turbine engines typically include a compressor, a combustor, and at least one turbine. The compressor may compress air, which may be mixed with fuel and channeled to the combustor. The mixture may then be ignited for generating hot combustion gases, and the combustion gases may be channeled to the turbine. The turbine may extract energy from the combustion gases for powering the compressor, as well as producing useful work to propel an aircraft in flight or to power a load, such as an electrical generator.

The turbine may include a stator assembly and a rotor assembly. The stator assembly may include a stationary nozzle assembly having a plurality of circumferentially spaced apart airfoils extending radially between inner and outer bands, which define a flow path for channeling combustion gases therethrough. Typically the airfoils and bands are formed into a plurality of segments, which may include one or two spaced apart airfoils radially extending between an inner and an outer band. The segments are joined together to form the nozzle assembly.

The rotor assembly may be downstream of the stator assembly and may include a plurality of blades extending radially outward from a disk. Each rotor blade may include an airfoil, which may extend between a platform and a tip. Each rotor blade may also include a root that may extend below the platform and be received in a corresponding slot in the disk. Alternatively, the disk may be a blisk or bladed disk, which may alleviate the need for a root and the airfoil may extend directly from the disk. The rotor assembly may be bounded radially at the tip by a stationary annular shroud. The shrouds and platforms (or disk, in the case of a blisk) define a flow path for channeling the combustion gases therethrough.

As gas temperatures rise due to the demand for increased performance, components may not be able to withstand the increased temperatures. Higher gas temperatures lead to higher metal temperatures, which is a primary contributor to distress. Bands are susceptible to this distress, in particular, on the aft side of the bands. Distress may cause cracking or holes to form within these areas, leading to decreased performance and higher repair costs.

BRIEF DESCRIPTION OF THE INVENTION

In one exemplary embodiment, a method for repairing a turbine nozzle segment includes providing a turbine nozzle segment having an enclosure with an integral discourager, removing the discourager from the turbine nozzle segment and attaching a new discourager to the turbine nozzle segment.

In another exemplary embodiment, a method for repairing a turbine nozzle segment includes the steps of providing a turbine nozzle segment having an enclosure with an integral discourager, removing the enclosure and discourager from the turbine nozzle segment and attaching a new enclosure and discourager to the turbine nozzle segment.

DETAILED DESCRIPTION OF THE INVENTION

Figure 1:
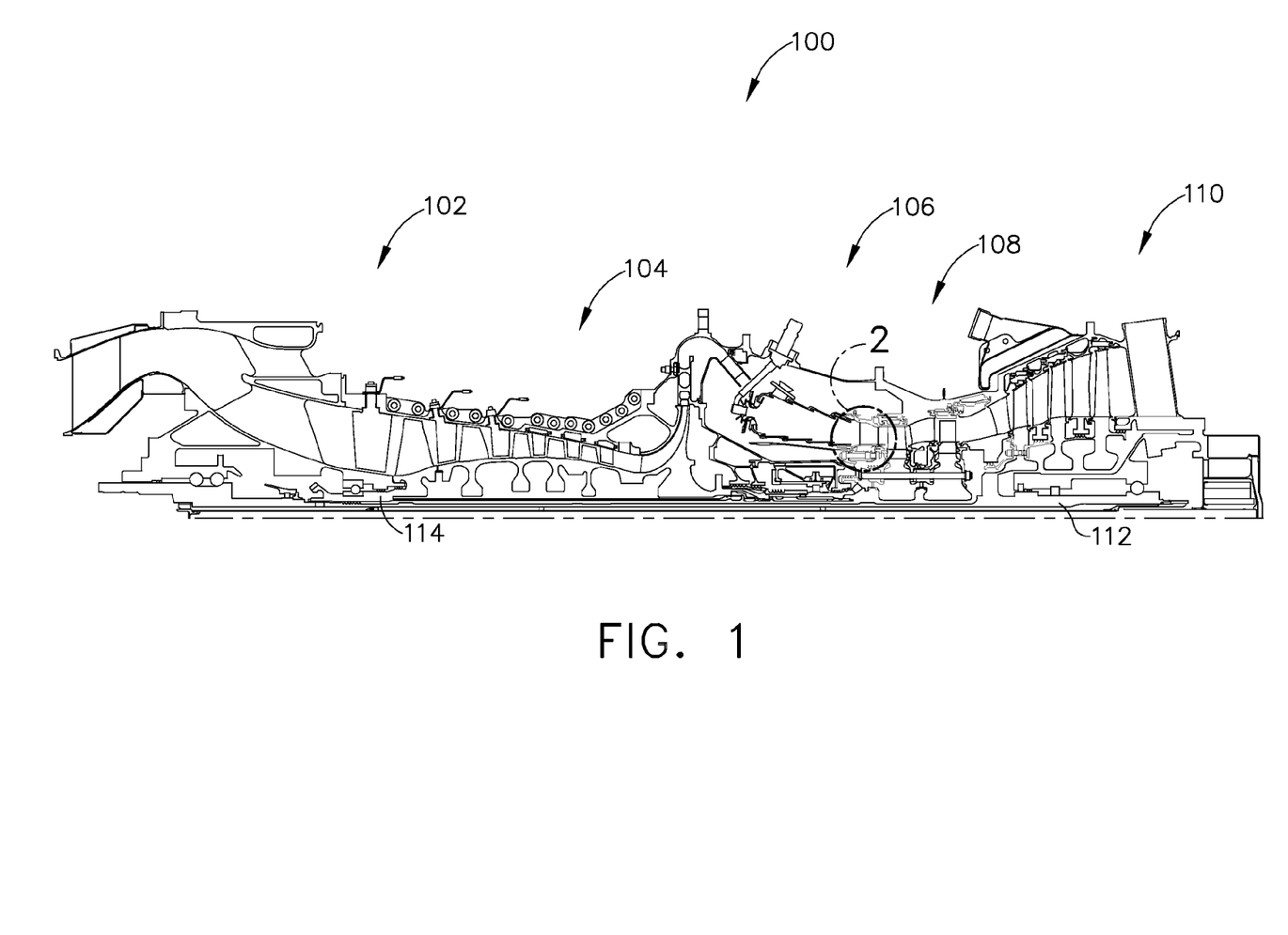
FIG. 1 is a cross-sectional view of an exemplary gas turbine engine.

FIG. 1 illustrates a cross-sectional schematic view of an exemplary gas turbine engine 100. The gas turbine engine 100 may include a low-pressure compressor 102, a high-pressure compressor 104, a combustor 106, a high-pressure turbine 108, and a low-pressure turbine 110. The low-pressure compressor may be coupled to the low-pressure turbine through a shaft 112. The high-pressure compressor 104 may be coupled to the high-pressure turbine 108 through a shaft 114. In operation, air flows through the low-pressure compressor 102 and high-pressure compressor 104. The highly compressed air is delivered to the combustor 106, where it is mixed with a fuel and ignited to generate combustion gases. The combustion gases are channeled from the combustor 106 to drive the turbines 108 and 110. The turbine 110 drives the low-pressure compressor 102 by way of shaft 112. The turbine 108 drives the high-pressure compressor 104 by way of shaft 114.

Figure 2:
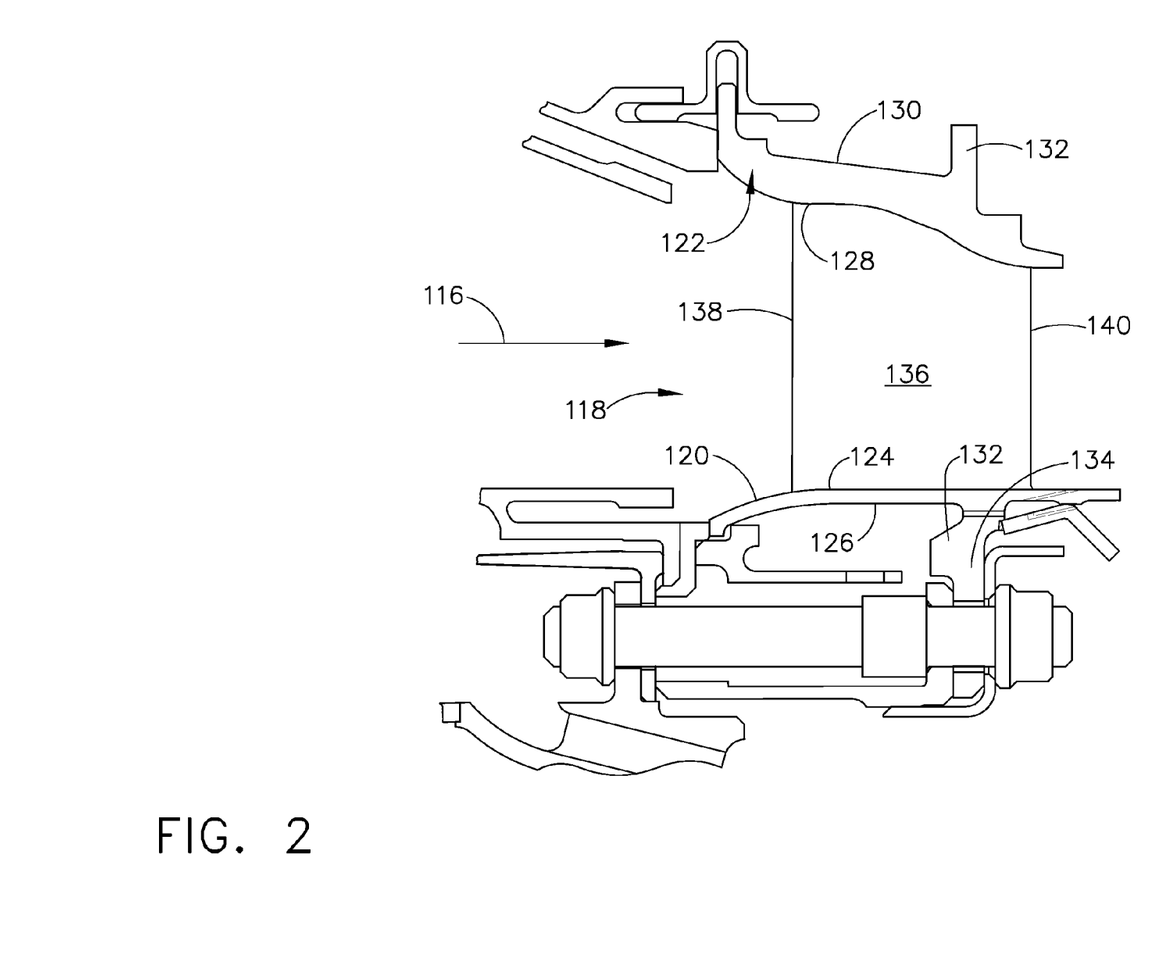
FIG. 2 is a cross sectional view of an exemplary embodiment of a turbine nozzle assembly.
Figure 3:
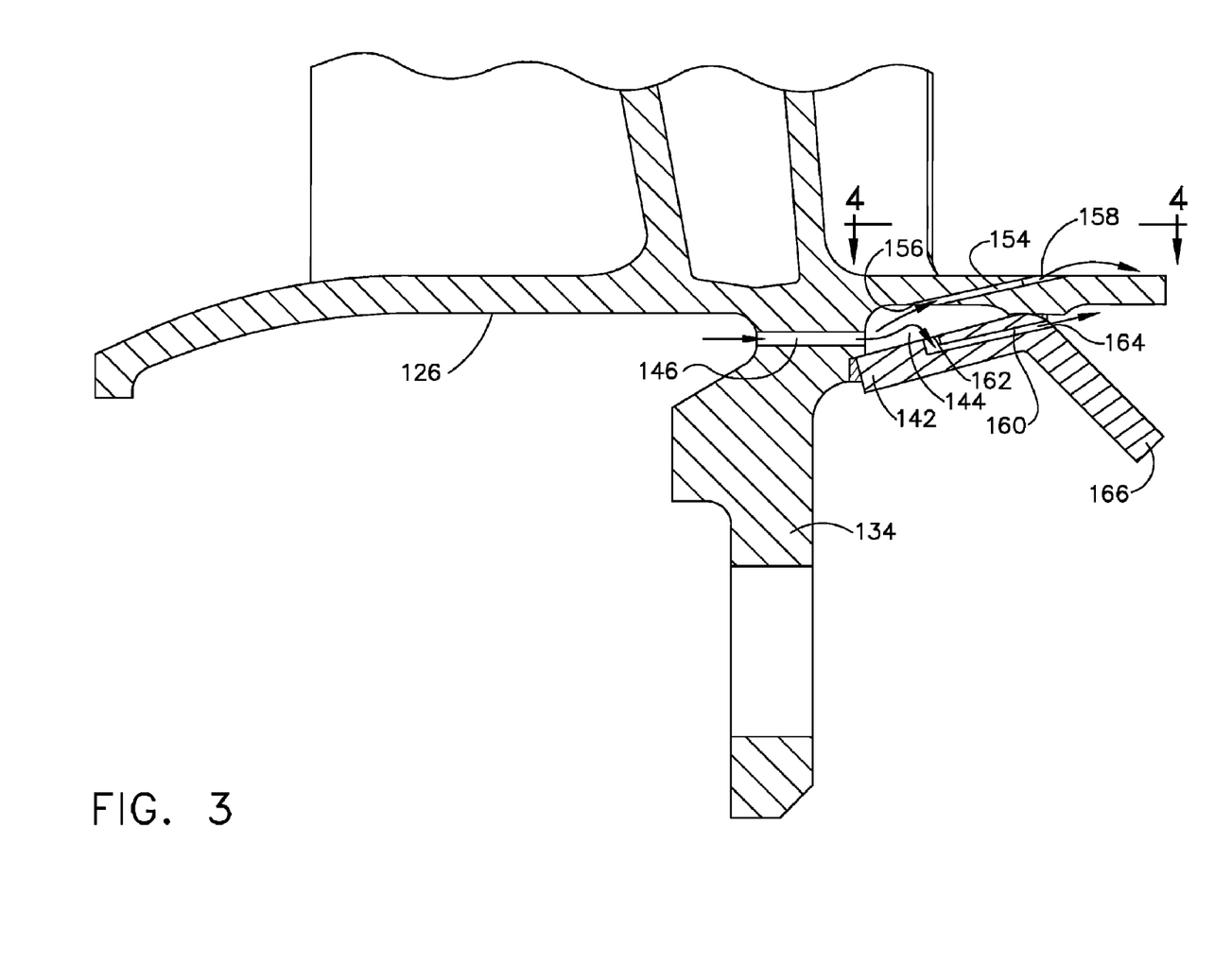
FIG. 3 is close-up cross-sectional view of an exemplary embodiment of a band of a turbine nozzle assembly.

As shown in FIGS. 2-7, the high-pressure turbine 108 may include a turbine nozzle assembly 116. The turbine nozzle assembly 116 may be downstream of the combustor 106 or a row of turbine blades. The turbine nozzle assembly 116 includes an annular array of turbine nozzle segments 118. A plurality of arcuate turbine nozzle segments 118 may be joined together to form the annular turbine nozzle assembly 116. The turbine nozzle segments 118 may have an inner band 120 and an outer band 122, which radially bound the flow of combustion gases through the turbine nozzle assembly 116. The inner band 120 may have a flowpath side 124 and a non-flowpath side 126 and the outer band 122 may have a flowpath side 128 and a non-flowpath side 130. One or more flanges 132 may extend from the non-flowpath sides 128 and 130 of the inner band 120 and outer band 122. For example, as shown in FIGS. 2 and 3, flange 134 extends radially from said the inner band 120 and may be used to attach the turbine nozzle assembly 116 to other components of the gas turbine engine 100.

One or more airfoils 136 extend radially between the inner band 120 and outer band 122 for directing the flow of combustion gases through the turbine nozzle assembly 116. The airfoils 136 have a leading edge 138 on the forward side of the turbine nozzle segment 118 and a trailing edge 140 on the aft side of the turbine nozzle segment 118. The airfoils 136 may be formed of solid or hollow construction. Hollow airfoils may include one or more internal cooling passages for cooling the airfoil and providing film cooling to the airfoil surfaces. Other hollow airfoils may include one or more cavities for receiving a cooling insert. The cooling insert may have a plurality of cooling holes for impinging on the interior surface of the hollow airfoil before exiting as film cooling through holes in the airfoil. Any configuration of airfoil known in the art may be used.

Figure 6:
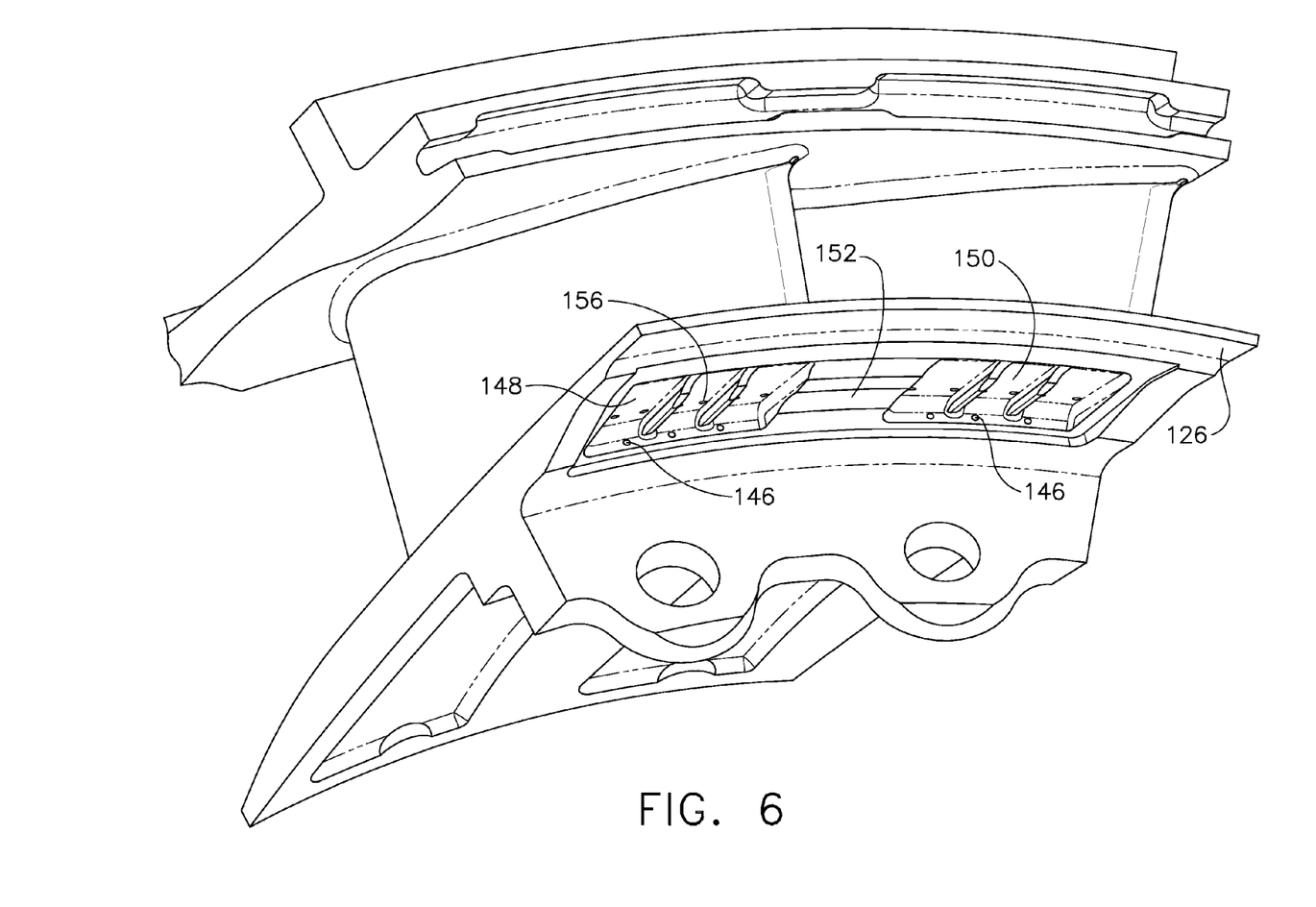
FIG. 6 is another prospective view of an exemplary embodiment of a turbine nozzle segment shown with the enclosure removed.
Figure 7:
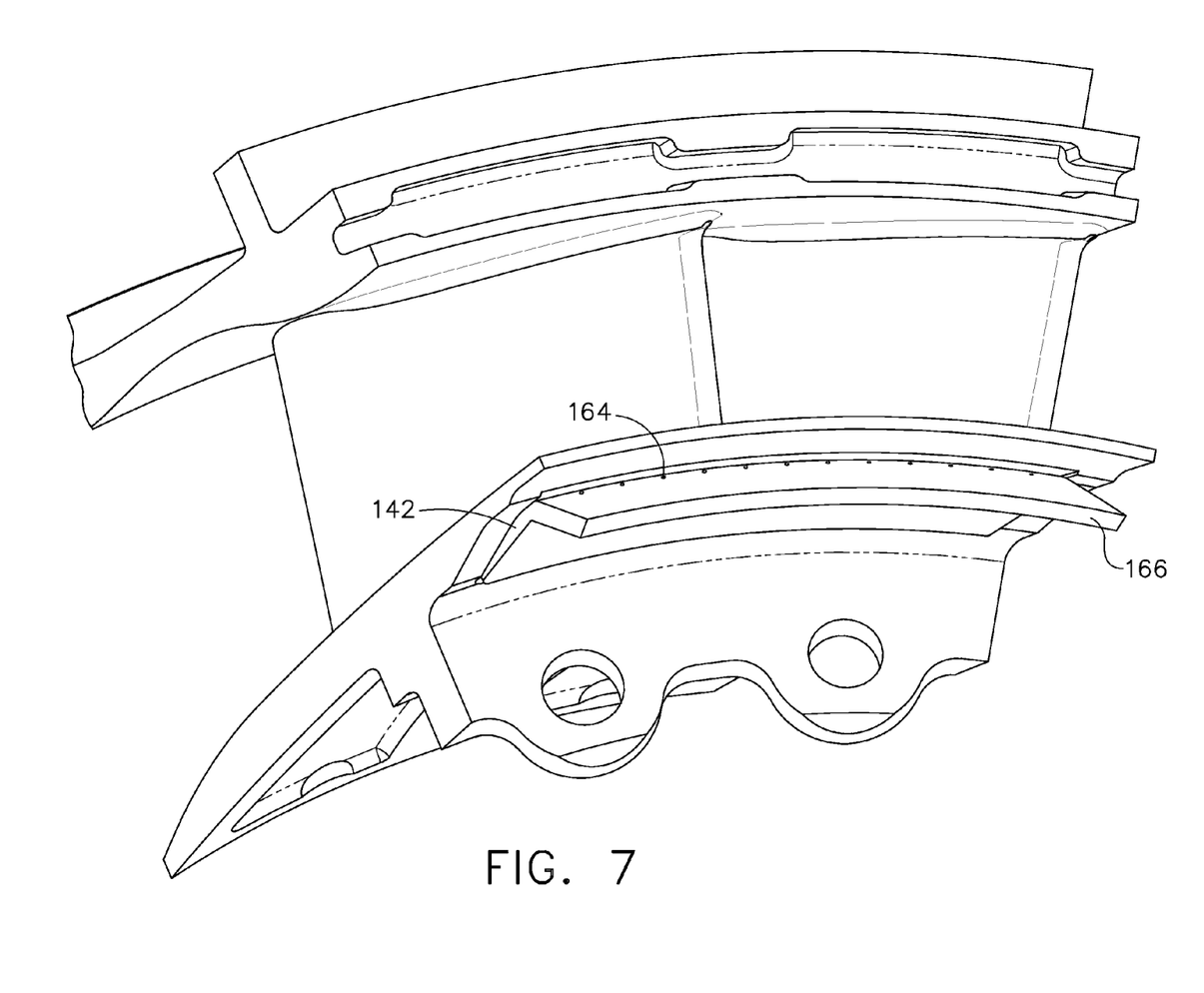
FIG. 7 is another prospective view of an exemplary embodiment of a turbine nozzle segment shown with the enclosure.

Band, as used below, may mean the inner band 120, the outer band 122 or each of the inner band 120 and outer band 122. An enclosure 142 may be associated with the non-flowpath side 126, 130 of the band. The enclosure 142 may be formed integrally with the band or may be attached in any manner known in the art, such as, but not limited to, brazing. In one exemplary embodiment, the enclosure 142 may extend between the non-flowpath side 126, 130 of the band and the flange 132. The enclosure 142, non-flowpath side 126, 130 of the band and the flange 132 may define a plenum 144. The plenum 144 may receive cooling air through one or more holes 146 in the flange 132. Air may be routed to the one or more holes 146 through any manner known in the art. As shown in FIG. 6, the plenum 144 may be formed as two cavities 148 and 150 in the non-flowpath side 126, 130 of the band with a channel 152 connecting therebetween.

Figure 4:
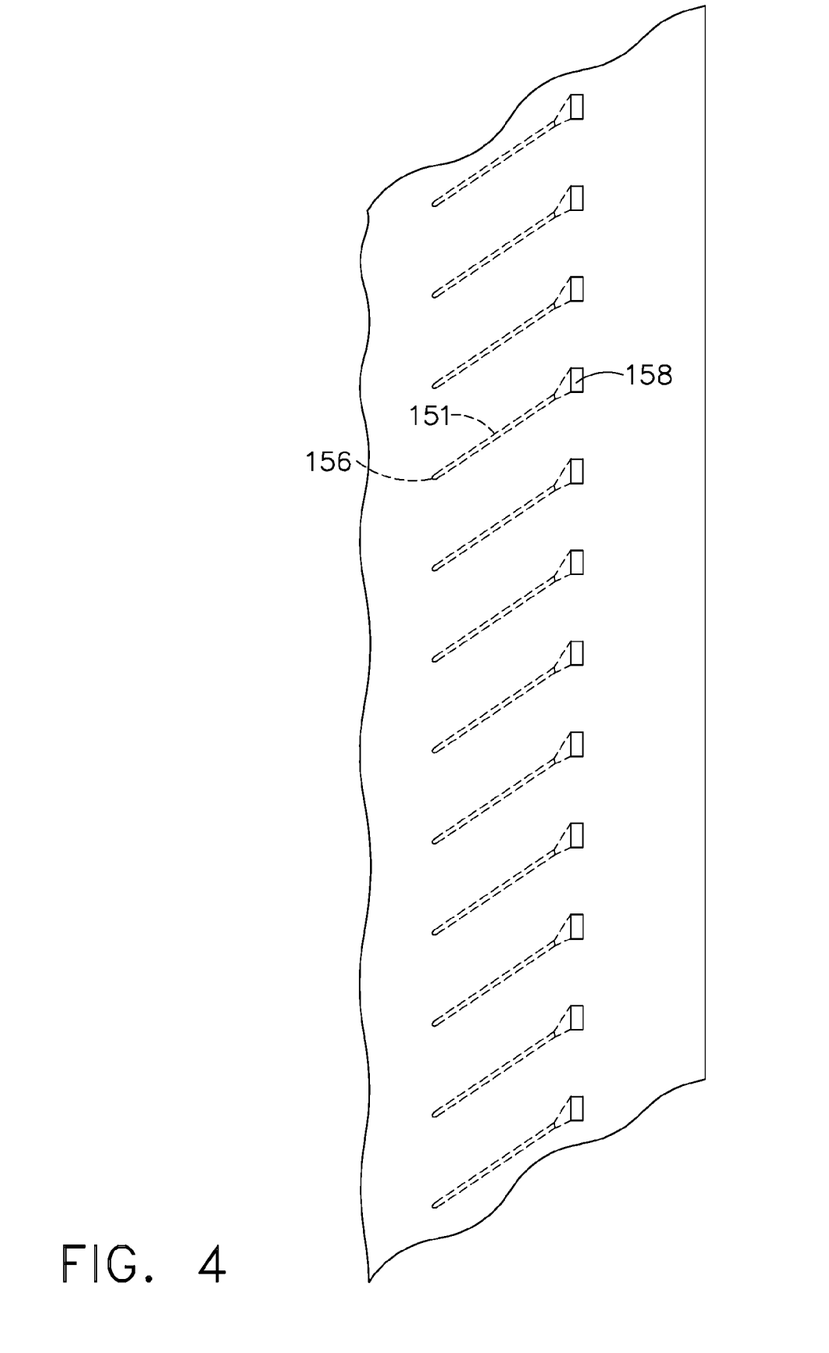
FIG. 4 is a close-up plan view of the flow path side of an exemplary embodiment of a band of a turbine nozzle assembly.
Figure 5:
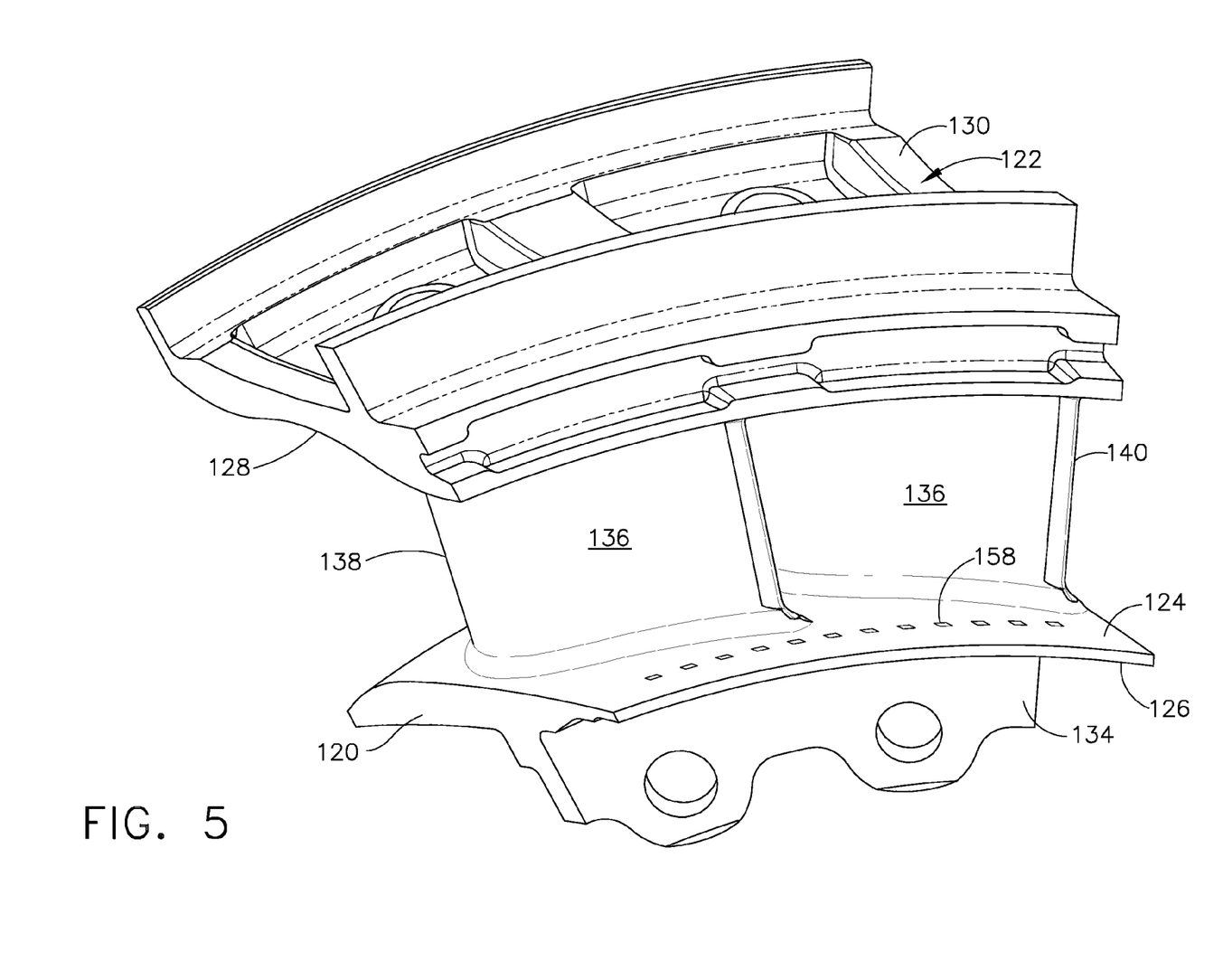
FIG. 5 is a prospective view of an exemplary embodiment of a turbine nozzle segment.

In one exemplary embodiment, the band may have a plurality of cooling holes 154 formed therein. The plurality of cooling holes 154 may have an inlet 156 at the plenum 144 for receiving cooling air therefrom. The plurality of cooling holes 154 may have an outlet 158 for providing film cooling to the flowpath side 124, 128 of the band. In one exemplary embodiment, as shown in FIG. 4, the outlets 158 of the plurality of cooling holes 154 may be flared to increase the amount of film cooling. A plurality of cooling holes 160 may be formed in the enclosure 142. The plurality of cooling holes 160 may have an inlet 162 at the plenum 144 for receiving cooling air therefrom. The plurality of cooling holes 160 may have an outlet 164 for providing impingement cooling to the non-flowpath side 126, 130 of the band. In one exemplary embodiment, a discourager 166 may be associated with the enclosure 142. The discourager 166 may be formed integrally with said enclosure 142 or may be attached in any manner known in the art, such as, but not limited to, brazing. The discourager 166 may act as a shield for the non-flowpath side 126, 130 of the band to keep hot gases away therefrom. In one exemplary embodiment, the enclosure 142, plenum 144, and associated cooling holes may be located on the aft side of the band.

By providing cooling in these areas, the metal temperature may be reduced, leading to less distress and less likelihood of forming a crack or hole. As such, the turbine nozzle segment will last longer leading to less repairs and/or replacements over time for the gas turbine engine.

Figure 8:
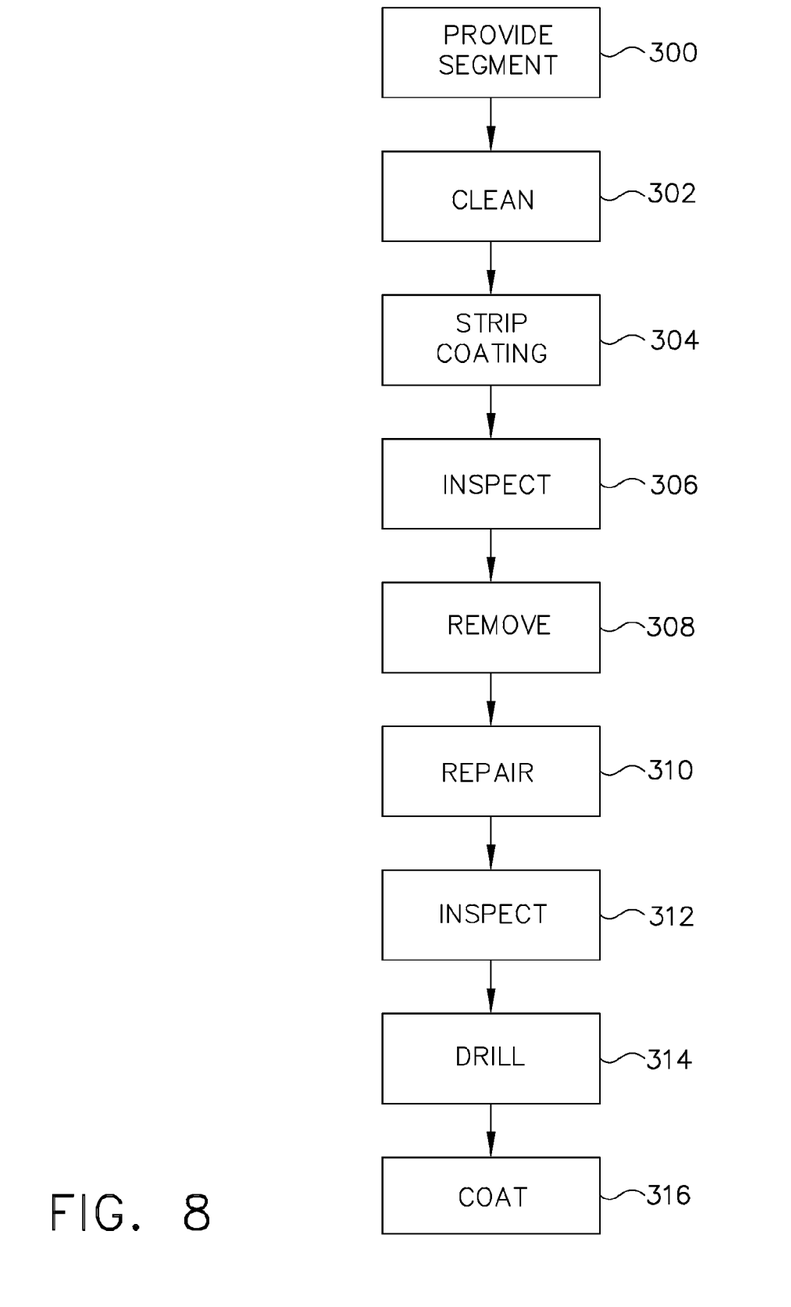
FIG. 8 is a flow chart showing one exemplary embodiment of a repair method.

FIG. 8 illustrates an exemplary embodiment of a repair procedure. An engine-run turbine nozzle segment may be provided at step 300. The turbine nozzle segment may be coated with a thermal barrier coating. The turbine nozzle segment may be cleaned at step 302. Cleaning may include grit blasting that may remove any corrosion from engine use. Once the turbine nozzle segment is cleaned, the coating may be removed at step 304. This step may be skipped should the nozzle segment not have a coating. An acid bath may be used to strip the coating. Any acid known in the art may be used. Once the coating is removed, the nozzle segment may be inspected at step 306 to look for any cracks or distressed areas in the base metal. If cracks are found, the damaged material may be removed at step 308. In one exemplary embodiment, a damaged area may be the enclosure 142 and/or the discourager 166. The enclosure 142 and discourager 166 may be removed together by placing the nozzle segment into an oven and heating the nozzle segment to a temperature high enough to melt the braze material used to attach the enclosure 142 and discourager 166 to the band. This will allow the enclosure 142 and discourager 166 to be removed without damaging the segment to segment braze material, which has a higher melting temperature than the braze used for the enclosure 142. In another exemplary embodiment, the discourager 166 may be cut away from the enclosure 142 or the enclosure 142 and discourager may be cut away from the band, depending on which components are damaged.

At step 310, a new enclosure 142 and/or discourager 166 may be attached to the nozzle segment. Any other damaged areas of the nozzle segment may be repaired at the same time, either through replacements or through weld repairs where material is added to a damage area and then formed to normal size. The component may be inspected again at step 312. Cooling holes 160 may be formed integrally with the enclosure. Alternatively, at step 314, the cooling holes 160 may need to be drilled if only the discourager 166 was replaced in step 310. The holes 160 may be formed in any manner known in the art, such as, but not limited to, electrodischarge machining, electrochemical machining, laser drilling, mechanical drilling, or any other similar manner. Once all repairs are complete, a new thermal barrier coating may be formed at step 316.

This written description discloses exemplary embodiments, including the best mode, to enable any person skilled in the art to make and use the exemplary embodiments. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for repairing a turbine nozzle segment, the method comprising:
   providing a turbine nozzle segment comprising
      a band having a flowpath side and a non-flowpath side,
      an enclosure disposed on said non-flowpath side of said band, said enclosure including a plurality of cooling holes,
      a plenum defined between said band and said enclosure, said plurality of cooling holes in said enclosure having an inlet at said plenum and an outlet disposed so as to impinge on said non-flowpath side of said band, and
      an integral discourager extending from said enclosure;
   removing said discourager from said turbine nozzle segment; and
   attaching a new discourager to said turbine nozzle segment.

2. The method for repairing a turbine nozzle segment of claim 1 further comprising: cleaning said turbine nozzle segment prior to said removing step.

3. The method for repairing a turbine nozzle segment of claim 1 further comprising: stripping a thermal barrier coating from said turbine nozzle segment prior to said removing step.

4. The method for repairing a turbine nozzle segment of claim 1 further comprising: inspecting said turbine nozzle segment prior to said removing step.

5. The method for repairing a turbine nozzle segment of claim 1 wherein said removing step further comprises: removing said discourager from said turbine nozzle segment by cutting.

6. The method for repairing a turbine nozzle segment of claim 1 further comprising: coating said turbine nozzle segment with a thermal barrier coating after said attaching step.

7. The method for repairing a turbine nozzle segment of claim 1 further comprising: inspecting said turbine nozzle segment after said attaching step.

8. The method for repairing a turbine nozzle segment of claim 1 further comprising: drilling cooling holes into said enclosure after said attaching step.

9. The method for repairing a turbine nozzle segment of claim 1, wherein said band includes a plurality of cooling holes.

10. The method for repairing a turbine nozzle segment of claim 9, wherein said plurality of cooling holes in said band have an inlet in said plenum.

11. The method for repairing a turbine nozzle segment of claim 10, wherein said plurality of cooling holes in said band have an outlet on said flowpath side of said band.

12. The method for repairing a turbine nozzle segment of claim 11, wherein said outlets for said plurality of cooling holes in said band are flared.

13. The method for repairing a turbine nozzle segment of claim 12, wherein said enclosure is brazed to said band.

14. The method for repairing a turbine nozzle segment of claim 1, wherein said enclosure is brazed to said band.

\* \* \* \* \*